United States Patent
Nicolas

(10) Patent No.: US 10,089,954 B2
(45) Date of Patent: Oct. 2, 2018

(54) METHOD FOR COMBINED TRANSFORMATION OF THE SCALE AND ASPECT RATIO OF A PICTURE

(71) Applicant: STMicroelectronics (Grenoble 2) SAS, Grenoble (FR)

(72) Inventor: Marina Nicolas, Voreppe (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 15/659,449

(22) Filed: Jul. 25, 2017

(65) Prior Publication Data

US 2017/0337896 A1 Nov. 23, 2017

Related U.S. Application Data

(63) Continuation of application No. 14/607,523, filed on Jan. 28, 2015, now Pat. No. 9,747,863.

(30) Foreign Application Priority Data

Jan. 29, 2014 (FR) ...................................... 1400239

(51) Int. Cl.
  *G09G 5/00* (2006.01)
  *G06T 3/00* (2006.01)
  *G06T 3/40* (2006.01)

(52) U.S. Cl.
  CPC ........... *G09G 5/005* (2013.01); *G06T 3/0012* (2013.01); *G06T 3/40* (2013.01); *G09G 2340/0442* (2013.01)

(58) Field of Classification Search
  None
  See application file for complete search history.

(56) References Cited

U.S. PATENT DOCUMENTS

| | | | |
|---|---|---|---|
| 2002/0057369 A1 | 5/2002 | Takechi et al. | |
| 2007/0250867 A1* | 10/2007 | Kuwabara | H04N 5/45 725/75 |
| 2007/0257996 A1 | 11/2007 | Kurosawa et al. | |
| 2010/0045689 A1* | 2/2010 | Hsieh | G09G 5/393 345/545 |
| 2010/0097488 A1 | 4/2010 | Suzuki | |
| 2012/0176471 A1 | 7/2012 | Cheng et al. | |
| 2013/0243333 A1 | 9/2013 | Nicolas | |

(Continued)

OTHER PUBLICATIONS

Chen et al., "A visual attention model for adapting images on small displays," *Multimedia Systems* 9:353-364, 2003.

(Continued)

*Primary Examiner* — James A Thompson
(74) *Attorney, Agent, or Firm* — Seed IP Law Group LLP

(57) ABSTRACT

A source image is transformed into a destination image having a target aspect ratio. A reference region in the source image is defined. An extended region of interest of the source image having the target aspect ratio and containing the reference region is defined. A set of candidate image regions of increasing resolutions from the extended region of interest is determined, each having the target aspect ratio and containing the reference region. Candidate image regions are scaled to form a candidate target images. A quality metric is used to select a target image providing the best quality metric value.

26 Claims, 1 Drawing Sheet

(56) References Cited

U.S. PATENT DOCUMENTS

2014/0020090 A1* 1/2014 Nada .................. G06K 9/036
 726/19
2014/0268247 A1* 9/2014 Sakaida .................. H04N 1/387
 358/406

OTHER PUBLICATIONS

Cheng et al., "Video Adaptation for Small Display Based on Content Recomposition," *IEEE Transactions on Circuits and Systems for Video Technology* 17(1):43-58, 2007.

Crété-Roffet et al., "The Blur Effect: Perception and Estimation with a New No-Reference Perceptual Blur Metric," SPIE Electronic Imaging Symposium Conf. Human Vision and Electronic Imaging, San Jose, CA, pp. EI 6492-16, 2007, 11 pages.

Setlur et al., "Automatic Image Retargeting," Proceedings of the 4$^{th}$ International Conference on Mobile and Ubiquitous Multimedia, Jan. 2005, pp. 59-68.

Setlur et al., "Retargeting Images and Video for Preserving Information Saliency," *IEEE Computer Graphics and Applications* 27(5):80-86, Sep./Oct. 2007.

* cited by examiner

METHOD FOR COMBINED TRANSFORMATION OF THE SCALE AND ASPECT RATIO OF A PICTURE

BACKGROUND

Technical Field

This disclosure relates to the rendering of images on displays, or on display areas having a resolution and/or an aspect ratio differing from those of the original image.

Description of the Related Art

Given the numerous image formats (still or video), with a variety of resolutions and aspect ratios, it often happens that a display is not adapted to the original image, for example when viewing a 4/3 video on a 16/9 display, or vice versa. The formats for still pictures are even more varied, whereby more difficulties are encountered.

In some applications, it is desired to display a mosaic of images, such as thumbnails of a photo album, or sub-pictures often called Picture-In-Picture (PIP) from multiple sources. Thumbnails or sub-pictures may have an aspect ratio close to 1, while the sources may have an aspect ratio of 16/9 or 4/3, or other ratios, such as for photos.

FIG. 1 illustrates two conventional rendering techniques that may be used to display a 16/9 image (left) in a square thumbnail (right), for example.

In the upper thumbnail, the original image's aspect ratio is preserved. The scaling of the original image is calculated to match the largest dimension of the image to a side of the square. The modified image is centered vertically in the square, and black bands are displayed in the areas of the square corresponding to no image. Part of the thumbnail is not used to display the image.

In the lower thumbnail, the image is transformed to fill the square. For this purpose, the vertical and horizontal dimensions of the original image undergo different scaling factors. The entire surface of the thumbnail is used to display the image, but the image has a vertical stretch distortion.

Moreover, visual quality deterioration may often be perceived in the thus processed images, even when using sophisticated scaling algorithms.

BRIEF SUMMARY

In an embodiment, a method of transforming a source image in a destination image having a target aspect ratio, comprises defining a reference region in the source image; finding a minimal zone of the source image having the target aspect ratio and containing the reference region; forming a set of candidate image regions of increasing resolutions from the minimal region, each having the target aspect ratio and containing the reference region; scaling each candidate region to form a candidate target image; calculating a quality metric on each candidate target image; and selecting for the final target image, the candidate target image providing the best quality metric value.

The reference region may be defined by a region-of-interest search algorithm.

The method may comprise storing a list of unfavorable scaling factors; and when forming the set of candidate image regions, omitting candidate regions producing any of the unfavorable scaling factors in forming the target image.

The method may comprise calculating a default quality metric on each candidate target image; if the default quality metric does not produce a discriminating value on the set of candidate target images, calculating a second quality metric for each candidate target image; and selecting the candidate target image providing the best value for the second quality metric.

The quality metric may be blur metric, such as a blur metrix based only on the target image.

The quality metric may be a structural similarity factor based on the candidate image region and the corresponding candidate target image.

The default quality metric may be a blur metric based only on the target image, and the second quality metric may be a structural similarity factor based on the candidate image region and the corresponding candidate target image.

In an embodiment, a method comprises: determining a reference region of a source image; determining an extended region of interest of the source image, the extended region of interest having a target aspect ratio and containing the reference region; determining a set of candidate image regions including regions of increasing size from the extended region of interest, each candidate image region having the target aspect ratio and containing the reference region; scaling candidate image regions to form a set of candidate target images; determining quality metric values of images of the set of candidate target images; and selecting one of the candidate target images of the set of candidate target images as a target image based on the determined quality metric values. In an embodiment, the method comprises using a region-of-interest search algorithm to determine the reference region. In an embodiment, the method comprises storing a list of unfavorable scaling factors; and excluding candidate regions producing any of the unfavorable scaling factors from the set of candidate target images. In an embodiment, the method comprises: determining a default quality metric value for each candidate target image of the set of candidate target images; and when the determined default quality metric values do not satisfy an image quality criteria, calculating a second quality metric value for each candidate target image of the set of candidate target images; and selecting one of the candidate target images of the set of candidate target images based on the determined second quality metric values. In an embodiment, the quality metric is a blur metric based only on a candidate target image. In an embodiment, the quality metric is a structural similarity factor (SSIM) based on a candidate image region and corresponding candidate target image. In an embodiment, the default quality metric is a blur metric based only on a candidate target image, and the second quality metric is a structural similarity factor based on a candidate image region and a corresponding candidate target image. In an embodiment, the set of candidate image regions includes the extended region of interest. In an embodiment, the reference region includes a plurality of regions of interest.

In an embodiment, a device comprises: one or more memories; and one or more processing devices which, in operation, determine an extended region of interest of a source image, the extended region of interest having a target aspect ratio and containing a reference region of the source image; determine a set of candidate image regions of the source images, the set of candidate image regions including regions of increasing size from the extended region of interest, each candidate image region having the target aspect ratio and containing the reference region; scale candidate image regions to form a set of candidate target images; determine quality metric values of images of the set of candidate target images; and select one of the candidate target images of the set of candidate target images as a target image based on the determined quality metric values. In an embodiment, the one or more processing device, in operation, determine the reference region using a region of interest search algorithm. In an embodiment, in operation, the one or more memories store a list of unfavorable scaling factors; and candidate regions producing any of the unfavorable scaling factors are excluded from the set of candidate target images. In an embodiment, in operation, the one or more processing devices: determine a default quality metric value for each candidate target image of the set of candidate target images; and when the determined default quality metric values do not satisfy an image quality criteria, determine a second quality metric value for each candidate target image of the set of candidate target images; and select one of the candidate target images of the set of candidate target images based on the determined second quality metric values. In an embodiment, the quality metric is a blur metric based only on a candidate target image. In an embodiment, the quality metric is a structural similarity factor (SSIM) based on a candidate image region and corresponding candidate target image. In an embodiment, the default quality metric is a blur metric based only on a candidate target image, and the second quality metric is a structural similarity factor based on a candidate image region and a corresponding candidate target image. In an embodiment, the set of candidate image regions includes the extended region of interest. In an embodiment, the reference region includes a plurality of regions of interest.

In an embodiment, a system comprises: means for determining an extended region of interest of a source image, the extended region of interest having a target aspect ratio and containing a reference region of the source image; means for determining a set of candidate image regions of the source images, the set of candidate image regions including regions of increasing size from the extended region of interest, each candidate image region having the target aspect ratio and containing the reference region; means for scaling candidate image regions to form a set of candidate target images; means for determining quality metric values of images of the set of candidate target images; and means for selecting one of the candidate target images of the set of candidate target images as a target image based on the determined quality metric values. In an embodiment, the system comprises: means for determining the reference region. In an embodiment, the system comprises: means for excluding candidate target regions having one of a set of scaling factors from the set of candidate target images. In an embodiment, the system comprises: means for selecting a quality metric.

In an embodiment, a non-transitory computer-readable medium's contents cause a computing device to perform a method, the method comprising: determining an extended region of interest of a source image, the extended region of interest having a target aspect ratio and containing a reference region; determining a set of candidate image regions including regions of increasing size from the extended region of interest, each candidate image region having the target aspect ratio and containing the reference region; scaling candidate image regions to form a set of candidate target images; determining quality metric values of images of the set of candidate target images; and selecting one of the candidate target images of the set of candidate target images as a target image based on the determined quality metric values. In an embodiment, the method comprises using a region-of-interest search algorithm to determine the reference region. In an embodiment, the method comprises: determining a default quality metric value for each candidate target image of the set of candidate target images; and when the determined default quality metric values do not satisfy an image quality criteria, calculating a second quality metric value for each candidate target image of the set of candidate target images; and selecting one of the candidate target images of the set of candidate target images based on the determined second quality metric values.

BRIEF DESCRIPTION OF THE SEVERAL VIEWS OF THE DRAWINGS

Other potential advantages and features of various embodiments will become more clearly apparent from the following description of particular embodiments provided for exemplary purposes only and represented in the appended drawings, in which.

DETAILED DESCRIPTION

An embodiment of an image processing method is described below in connection with the example of FIG. 1, where a 16/9 source image is transformed in a target image that may be displayed in a square area. In a general situation, the resolutions of the source and target images are different and the aspect ratios of these images are different and arbitrary.

Figure 1:
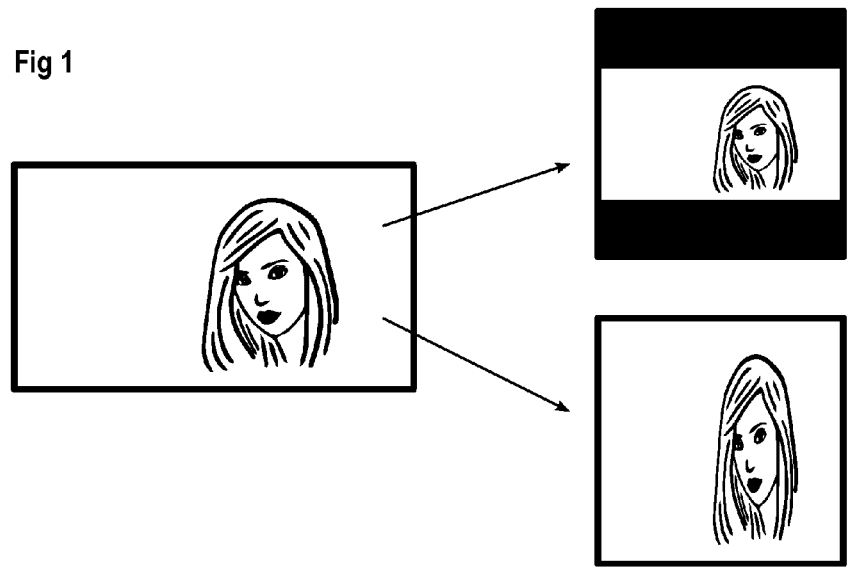
FIG. 1, previously described, shows a source image transformed using two different conventional techniques to be displayed with an aspect ratio different from that of the source image.
Figure 2A:
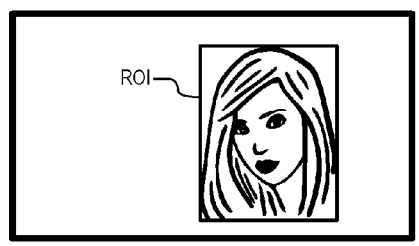
FIGS. 2A through 2C illustrate different steps of an image transformation method offering improved visual quality.

FIG. 2A shows the same source image as FIG. 1 having an aspect ratio of 16/9. It is desired to transform this image, in this example, to render it in a square area, having an aspect ratio of 1/1. The square area may be a photo album thumbnail or a sub-picture of a mosaic of TV channels. In this case, the resolution of the square area is generally lower than the resolution of the source image. In another example, the display area may have a higher resolution than the source image, for example when low resolution videos are displayed on an HD screen.

As noted above, it is desired to transform the source image to render it in an "intelligible" manner in the display area. In an embodiment, only a portion containing key information of the source image is displayed, having dimensions chosen to provide the best visual quality.

For this purpose, a reference region ROI is first defined in the source image, whose aspect ratio may be arbitrary. The reference region may be defined manually by the user, but it may be provided automatically by a conventional Region-Of-Interest (ROI) search algorithm.

Face recognition is a typical application of such an algorithm. In the example of FIG. 2A, a reference region ROI is defined around a face. As shown, this region ROI is rectangular with an aspect ratio close to 3/4, differing from the aspect ratio of the source image, but also differing from the aspect ratio of 1/1 of the display area.

Generally, region-of-interest search algorithms produce rectangular regions of arbitrary aspect ratio. They may also produce several regions of interest, for example in the presence of multiple faces.

Figure 2B:
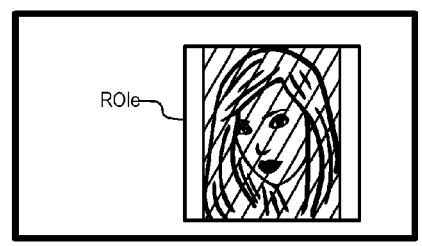

In FIG. 2B, an extended region of interest ROIe is defined, which has the aspect ratio of the target display (1/1 here), and may have a smallest size able to fully contain the reference area (hatched in the figure), or reference areas in the case where multiple regions of interest are identified. In this example, the extended region ROIe is a square whose upper and lower sides coincide with the upper and lower edges of the reference region ROI. The remaining, left and right sides may be, for example, at equal distances from the left and right edges of the reference region.

In a general situation, the reference region ROI is comprised within the source image such that there is a margin between each of the edges of the region ROI and the corresponding edge of the source image, as shown. If the margin is insufficient for centering the extended region ROIe around the reference region, such as when the reference region sits against an edge of the source image, the extended region may be uncentered with respect to the reference region in order to maintain the target aspect ratio.

In other words, if the margins around the reference region ROI allow it, the extended region ROIe may be centered about the reference region. If the margins are insufficient, the extended region may be shifted so as to maintain its aspect ratio while containing the reference region. In a borderline case example, in FIG. 2B, the right edge of the region ROI may coincide with the right edge of the source image. Then the extended region ROIe is shifted to the left so that its right edge coincides with the right edge shared between region ROI and the source image.

A region-of-interest search algorithm may produce several regions, for example in the presence of multiple faces. The extended region ROIe may then be defined, for example, to contain all the identified regions of interest, only the largest one, or the one closest to the center of the source image, a selected one of the regions of interest, etc.

Once the extended region ROIe is thus defined, it could be sufficient to scale it, homogeneously vertically and horizontally, to produce a target image compatible with the display area, e.g., that fills the display area without distortion.

However, it appears that some scaling factors, depending on the image content and the scaling algorithm, produce visual effects that affect the intelligibility or the perceived quality of the final image. Intelligibility is altered, for example, when the image contains fine repetitive structures, especially if they are in motion. The perceived quality is generally altered by a lower sharpness or sharpness variations of a texture. For example, when using bilinear and bicubic scaling algorithms, scale factors not equal to 1 comprised between 0.9 and 1.1 produce poor results in most cases. But other undesired values may exist that depend on image content.

Figure 2C:
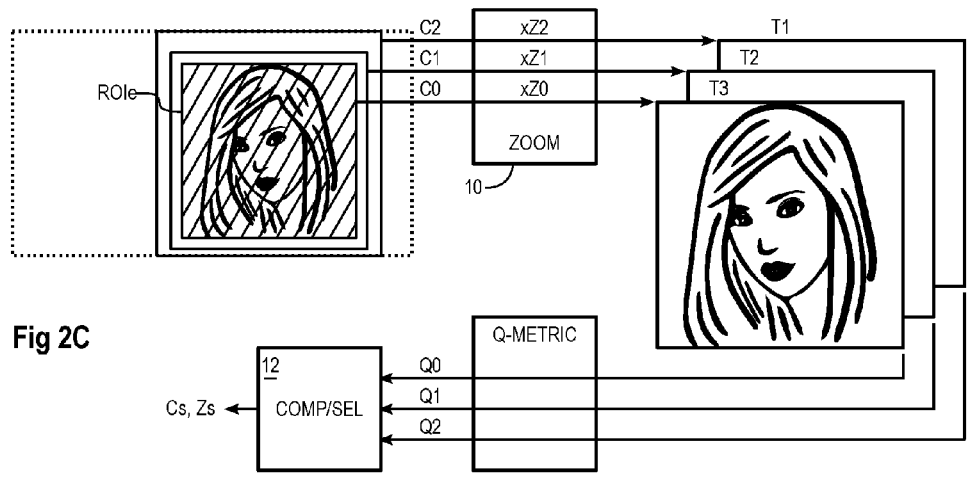

FIG. 2C illustrates a series of additional steps for producing a target image of good visual quality in an automated manner. Based on the extended region ROIe, hatched in FIG. 2C, a set of candidate image regions C0, C1, C2, . . . are formed that all contain the extended region ROIe and have the same aspect ratio (here 1/1). The first candidate region C0 is the extended region ROIe. The candidate regions grow from one to the next and, may remain centered on the initial region C0.

Several scaling factors for forming the target image are evaluated, and one that produces the best visual quality is selected, for example, according to an evaluation criteria.

A current candidate region may be defined by expanding the smaller dimension of the previous candidate region by an increment in number of pixels on either side. The larger dimension is adjusted, to the nearest pixel, to preserve the aspect ratio and centering. If the aspect ratio is 1/1, the previous candidate region may be expanded by one increment from each edge.

At one point, one of the edges of the current candidate region may reach the corresponding edge of the source image (the lower edge in FIG. 2C). In this case, the subsequent candidate regions may be enlarged in the remaining margin at the opposite side (upwards in FIG. 2C) and may be off-centered relative to the initial region C0.

The set of candidate regions may be completed when, as shown for region C2, the current candidate region reaches two opposite edges of the source image, and can no longer grow preserving the aspect ratio, when a threshold number of candidate regions is obtained, etc. In practice, a set of less than ten candidate regions is generally sufficient and the two edges of the image are reached only when the margins between the reference region and the edges of the source image are too small.

From each candidate region $C_i$ a candidate target image $T_i$ is formed by applying to the candidate region, at 10, the scaling factor $Z_i$ required to reach the resolution defined for the target image. On each candidate target image thus obtained a quality metric Q-METRIC is calculated. By comparing, in 12, the values Q produced for the quality metric, a candidate region $C_s$ and corresponding scaling factor $Z_s$ may be selected that produce the best quality metric value Q.

As indicated above, there are scaling factors that should almost always be avoided, regardless of the content of the source image and the scaling algorithm, for example factors not equal to 1 comprised between 0.9 and 1.1. There may be other unwanted factors that are independent of the content of the image but that depend on the scaling algorithm.

By storing a list of unwanted scaling factors, the method may be designed to exclude from the set to evaluate the candidate regions associated with scaling factors contained in the list. This reduces the number of candidates to assess to candidates that are likely to be selected.

Scaling factors above an upper threshold may be among the unwanted factors, because they lead to displaying in high-resolution an image area with too little information. If the reference region ROI (FIG. 2A) turns out to be too small, requiring a scaling factor above the threshold, the method may be designed to expand the extended reference region ROIe (FIG. 2B), and therefore the first candidate C0, to the size producing the threshold scaling factor. The region ROIe is then large relative to the region ROI; it may be centered about the region ROI.

Using this technique of selecting the extended reference region ROIe, the reference region ROI may be limited to a point of the image that the user may define manually using a human interface, such as a touch screen.

The quality metric may be chosen simple so that the calculations may be performed in real time without delaying the display of the final target image. In this case a blur metric based solely on the target image may be used, as described in [Frédérique Crete et al, "The Blur Effect. Perception and Estimation with a New No-Reference Perceptual Blur Metric" SPIE Electronic Imaging Symposium Conf., Human Vision and Electronic Imaging, San Jose 2007].

If computational resources are sufficient, a more sophisticated quality metric may be used, based on the source candidate region $C_i$ and on the target image $T_i$, such as a structural similarity factor (SSIM) modified as described in US patent application 2013-0243333. Such a modified SSIM factor enables the comparison of two images of different sizes. FIG. 2 also shows an image processing system 200, which as illustrated includes circuitry, such as one or more processors P, one or more memories M and discrete circuitry DC (e.g., logic gates, state machines, multiplexers, look-up tables, etc.), which, in operation, implements one or more embodiments of the methods described herein. For example, a processor P may execute a set of instructions stored in the memory M to perform an embodiment of one of the described methods.

In some circumstances a metric may be more discriminating than another, e.g., a first metric (e.g., the blur metric) may not distinctly reveal a better value in a set of candidates, while the second metric (e.g., the SSIM factor) may reveal a singular value on the same set of candidates. To account for this situation, the method may be designed to calculate a second metric on the candidates in cases where a default metric produces values below a threshold. The default metric may be the simplest to calculate, which leads to calculating the more sophisticated metric only in exceptional circumstances.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    determining a reference region of a source image;
    determining an extended region of interest of the source image, the extended region of interest having a target aspect ratio and containing the reference region;
    determining a set of candidate image regions including regions of increasing size from the extended region of interest, the set of candidate image regions comprising a plurality of candidate image regions, each candidate image region of the plurality of candidate image regions having the target aspect ratio and containing the reference region;
    scaling candidate image regions to form a set of candidate target images, the set of candidate target regions comprising a plurality of candidate target regions;
    determining quality metric values of images of the set of candidate target images;
    comparing the determined quality metric values of the images of the set of candidate target images; and
    selecting one of the candidate target images of the set of candidate target images as a target image based on the comparing.

2. The method of claim 1, comprising using a region-of-interest search algorithm to determine the reference region.

3. The method of claim 1, comprising:
    storing a list of unfavorable scaling factors; and
    excluding candidate regions producing any of the unfavorable scaling factors from the set of candidate target images.

4. The method of claim 1, comprising:
    determining a default quality metric value for each candidate target image of the set of candidate target images; and
    when the determined default quality metric values do not satisfy an image quality criteria, calculating a second quality metric value for each candidate target image of the set of candidate target images.

5. The method of claim 4 wherein the default quality metric is a blur metric based only on a candidate target image, and the second quality metric is a structural similarity factor based on a candidate image region and a corresponding candidate target image.

6. The method of claim 1 wherein the quality metric is a blur metric based only on a candidate target image.

7. The method of claim 1 wherein the quality metric is a structural similarity factor (SSIM) based on a candidate image region and corresponding candidate target image.

8. The method of claim 1 wherein the set of candidate image regions includes the extended region of interest.

9. The method of claim 1 wherein the reference region includes a plurality of regions of interest.

10. The method of claim 1 wherein the determining quality metric values of images of the set of candidate target images includes determining a plurality of quality metric values for images of the set of candidate target images.

11. A device, comprising:
    one or more memories; and
    image processing circuitry coupled to the one or more memories, wherein the image processing circuitry, in operation,
        determines an extended region of interest of a source image, the extended region of interest having a target aspect ratio and containing a reference region of the source image;
        determines a set of candidate image regions of the source images, the set of candidate image regions including regions of increasing size from the extended region of interest, the set of candidate image regions comprising a plurality of candidate image regions, each candidate image region of the plurality of candidate image regions having the target aspect ratio and containing the reference region;
        scales candidate image regions to form a set of candidate target images, the set of candidate target regions comprising a plurality of candidate target regions;

determines quality metric values of images of the set of candidate target images;

compares the determined quality metric values of the images of the set of candidate target images; and selects one of the candidate target images of the set of candidate target images as a target image based on the comparing.

12. The device of claim 11 wherein the image processing circuitry, in operation, determines the reference region using a region of interest search algorithm.

13. The device of claim 11 wherein, in operation, the one or more memories store a list of unfavorable scaling factors; and candidate regions producing any of the unfavorable scaling factors are excluded from the set of candidate target images.

14. The device of claim 11 wherein, in operation, the image processing circuitry:

determines a default quality metric value for each candidate target image of the set of candidate target images; and when the determined default quality metric values do not satisfy an image quality criteria, determines a second quality metric value for each candidate target image of the set of candidate target images.

15. The device of claim 14 wherein the default quality metric is a blur metric based only on a candidate target image, and the second quality metric is a structural similarity factor based on a candidate image region and a corresponding candidate target image.

16. The device of claim 11 wherein the quality metric is a blur metric based only on a candidate target image.

17. The device of claim 11 wherein the quality metric is a structural similarity factor (SSIM) based on a candidate image region and corresponding candidate target image.

18. The device of claim 11 wherein the set of candidate image regions includes the extended region of interest.

19. The device of claim 11 wherein the reference region includes a plurality of regions of interest.

20. A system, comprising:

means for determining an extended region of interest of a source image, the extended region of interest having a target aspect ratio and containing a reference region of the source image;

means for determining a set of candidate image regions of the source images, the set of candidate image regions including regions of increasing size from the extended region of interest, the set of candidate image regions comprising a plurality of candidate image regions, each candidate image region of the plurality of candidate image regions having the target aspect ratio and containing the reference region;

means for scaling candidate image regions to form a set of candidate target images, the set of candidate target regions comprising a plurality of candidate target regions;

means for determining quality metric values of images of the set of candidate target images;

means for comparing the determined quality metrix values of the images of the set of candidate target images; and means for selecting one of the candidate target images of the set of candidate target images as a target image based on the comparing.

21. The system of claim 20, comprising:

means for determining the reference region.

22. The system of claim 20, comprising:

means for excluding candidate target regions having one of a set of scaling factors from the set of candidate target images.

23. The system of claim 20, comprising:

means for selecting a quality metric.

24. A non-transitory computer-readable medium whose contents cause a computing device to perform a method, the method comprising:

determining an extended region of interest of a source image, the extended region of interest having a target aspect ratio and containing a reference region;

determining a set of candidate image regions including regions of increasing size from the extended region of interest, the set of candidate image regions comprising a plurality of candidate image regions, each candidate image region of the plurality of candidate image regions having the target aspect ratio and containing the reference region;

scaling candidate image regions to form a set of candidate target images, the set of candidate target regions comprising a plurality of candidate target regions;

determining quality metric values of images of the set of candidate target images;

comparing the determined quality metric values of the images of the set of candidate target images; and selecting one of the candidate target images of the set of candidate target images as a target image based on the comparing.

25. The medium of claim 24 wherein the method comprises using a region-of-interest search algorithm to determine the reference region.

26. The medium of claim 24 wherein the method comprises:

determining a default quality metric value for each candidate target image of the set of candidate target images; and when the determined default quality metric values do not satisfy an image quality criteria, calculating a second quality metric value for each candidate target image of the set of candidate target images.

* * * * *